(12) United States Patent
Wu (10) Patent No.: US 7,507,455 B2
(45) Date of Patent: Mar. 24, 2009

(54) FOIL BALLOON FOR ENABLING CUSTOMIZED DESIGN TO PRINT ON EITHER SIDE AND METHOD OF MANUFACTURING SAME

(76) Inventor: Teng-Hui Wu, No. 46-2, Lane 42, Jhongnan St., Nangang District, Taipei City (TW)

( * ) Notice: Subject to any disclaimer, the term of this patent is extended or adjusted under 35 U.S.C. 154(b) by 44 days.

(21) Appl. No.: 11/717,116

(22) Filed: Mar. 13, 2007

(65) Prior Publication Data
US 2008/0226761 A1 Sep. 18, 2008

(51) Int. Cl.
*B32B 27/10* (2006.01)
(52) U.S. Cl. .................. 428/34.3; 425/72.1; 446/220
(58) Field of Classification Search ............. 428/34.4; 138/93; 244/31; 446/220, 221–226
See application file for complete search history.

(56) References Cited

U.S. PATENT DOCUMENTS 5,656,362 A * 8/1997 Abrams ..................... 428/200
6,050,182 A * 4/2000 Arsenault et al. .......... 101/38.1
6,613,417 B1 * 9/2003 Banzai ..................... 428/195.1
2002/0178940 A1 * 12/2002 Kitchin et al. ............... 101/34
2004/0166260 A1 * 8/2004 Phillips ..................... 428/34.3

\* cited by examiner

*Primary Examiner*—Callie E Shosho
*Assistant Examiner*—Erik Kashnikow
(74) *Attorney, Agent, or Firm*—Bacon & Thomas, PLLC (57) ABSTRACT

A foil balloon for enabling a user to print a customized design on each of its sides comprises a carrier (e.g. paper) comprising a central opening, and an upper second foil and a lower first foil releasably attached onto top and bottom surfaces of the carrier respectively. A valve is provided between the first and second foils and is disposed correspondingly to an inner edge of the opening. A heat sealed portion is formed around the inner edge of the opening on each of the first and second foils after heat sealing the first and second foils together with the valve being sealed by the heat sealed portions of the first and second foils, and perforations are punched on each of the first and second foils at a position between the heat sealed portion and the inner edge of the opening.

7 Claims, 6 Drawing Sheets

FOIL BALLOON FOR ENABLING CUSTOMIZED DESIGN TO PRINT ON EITHER SIDE AND METHOD OF MANUFACTURING SAME

FIELD OF THE INVENTION

The invention relates to foil balloons and more particularly to such a foil balloon for enabling a user to print a customized design on either side and method of manufacturing same.

BACKGROUND OF THE INVENTION

Figure 1:
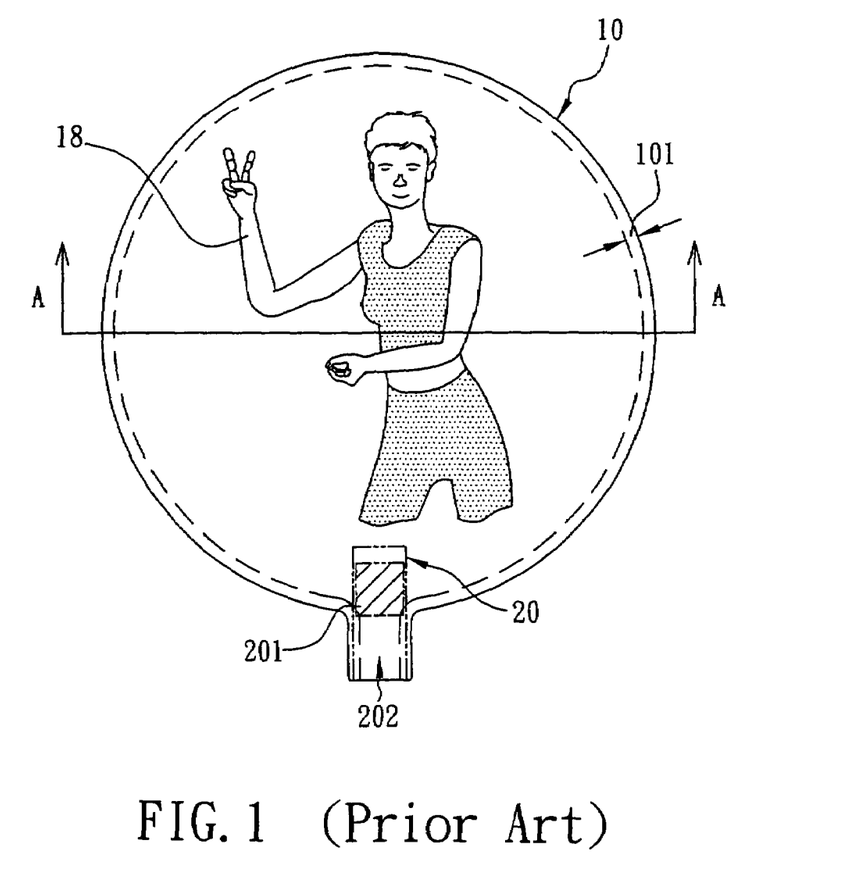
FIG. 1 is a top plan view of a conventional foil balloon with a pattern printed thereon.
Figure 2:
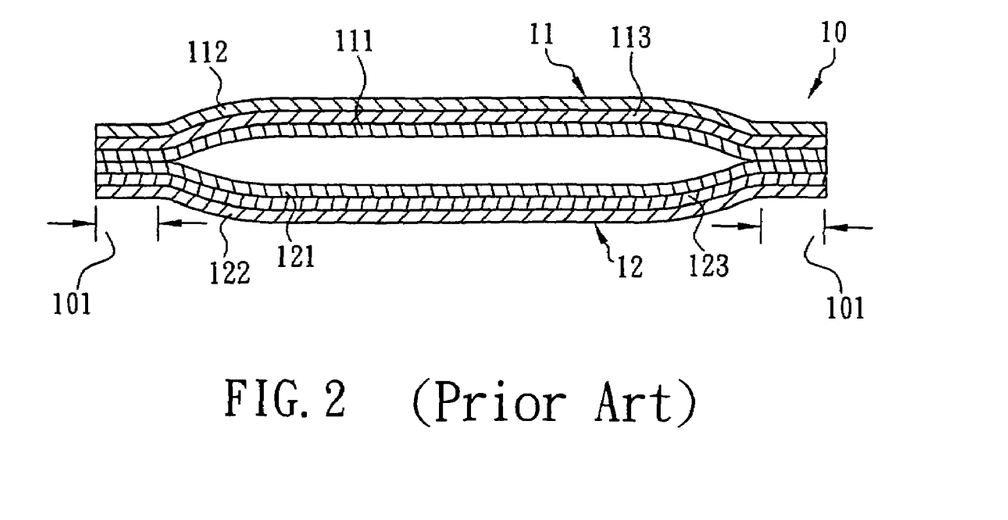
FIG. 2 is a sectional view of the balloon taken along line A-A of FIG. 1.

A conventional inflatable foil balloon (hereinafter called balloon) 10 is shown in FIGS. 1 and 2 and comprises an upper first foil 11, a lower second foil 12, and a valve 20. The laminated first foil 11 is comprised of a bottom PE (polyethylene) film 111, a nylon film 113 coated thereon, and an aluminum coating 112 coated on the nylon film 113. Likewise, the laminated second foil 12 is comprised of a top PE film 121, a nylon film 123 coated there under, and an aluminum coating 122 coated on a bottom of the nylon film 123. The provision of the aluminum coatings 112 and 122 aims at making a design printed on the nylon films 113 and 123 glossy as proposed by some manufacturers of the art. The valve 20 is provided at a joining point of the PE film 111 of the first foil 11 and the PE film 121 of the second foil 12 inside the balloon 10. The valve 20 has an inner end extending toward a center of a space defined by the PE films 111 and 121, and an outer end extending externally of the PE films 111 and 121. Facing inner surfaces at peripheral edges of the PE films 111 and 121 are overlapped and sealed together by heat sealing in a process of securing peripheral edges of the first and second foils 11 and 12 together. As a result, a heat sealed circular portion 101 is formed. Also, inner peripheral edges of the PE films 111 and 121 are heat sealed together with an outer surface of the valve 20, resulting in an airtight enclosure. An ink coating 201 is coated on the valve 20 and is disposed correspondingly to the heat sealed circular portion 101 as effected in the conventional balloon 10. Portion of the valve 20 corresponding to the ink coating 201 will not be heat sealed with a channel 202 formed when the peripheral edges of the first and second foils 11 and 12 are sealed together. Gas (e.g., air) can be forced through the channel 202 into the balloon 10 or pressurized gas within the balloon 10 can escape therethrough.

For inflating the balloon 10, it is typical of inserting a straw (not shown) through the channel 202 into the balloon 10. Next, a user may inflate the balloon 10 by exhaling into the straw or by means of an air compressor (or air pump). The user then removes the straw from the channel 202 after inflating the balloon 10 to a desired three-dimensioned sphere. A pressure difference between inside and outside of the balloon 10 can sealingly urge the valve 20 against an inner surface of the balloon 10 at the channel 202. Thus, the ink coating 201 coated on the valve 20 is sealingly engaged with the inner surface of the balloon 10 for preventing gas from escaping. That is, air passage through the channel 202 is completely blocked. A stick thus can insert into a projecting outlet of the balloon 10 proximate the valve 20 so that the balloon 10 can stand erect on a support or the like for display.

Referring to FIGS. 1 and 2 again, an outer surface of the balloon 10 (i.e., outer surfaces of the first and second foils 11 and 12) is formed of the nylon films 113 and 123. A design 18 chosen by the manufacturer is printed on the outer surfaces of the first and second foils 11 and 12 in advance due to the material nature of the nylon films 113 and 123. Hence, a person can only select a balloon 10 having a pre-printed design 18 which is attracting to him/her without other choices in buying. In other words, the printing cannot be customized. As a result, it greatly decreases applications of the well known balloon.

Thus, it is desirable to enable a user to print a desired design, preferably a colorful one, on the outer surface of the balloon. Such technique is disclosed in U.S. Pat. No. 6,613, 417 B1 entitled "Balloon made of synthetic resin and a method for manufacturing the balloon" which was filed Nov. 8, 2000 with an application Ser. No. 08/708,973 and assigned to a Japanese Transworld Information Inc. Further, U.S. Publication Application No. 2004/0166260 A1 discloses a method of and arrangement for manufacturing printed objects such as foil balloons which was filed Feb. 19, 2004 by Charles Phillips with an application Ser. No. 10/782,441.

Figure 3:
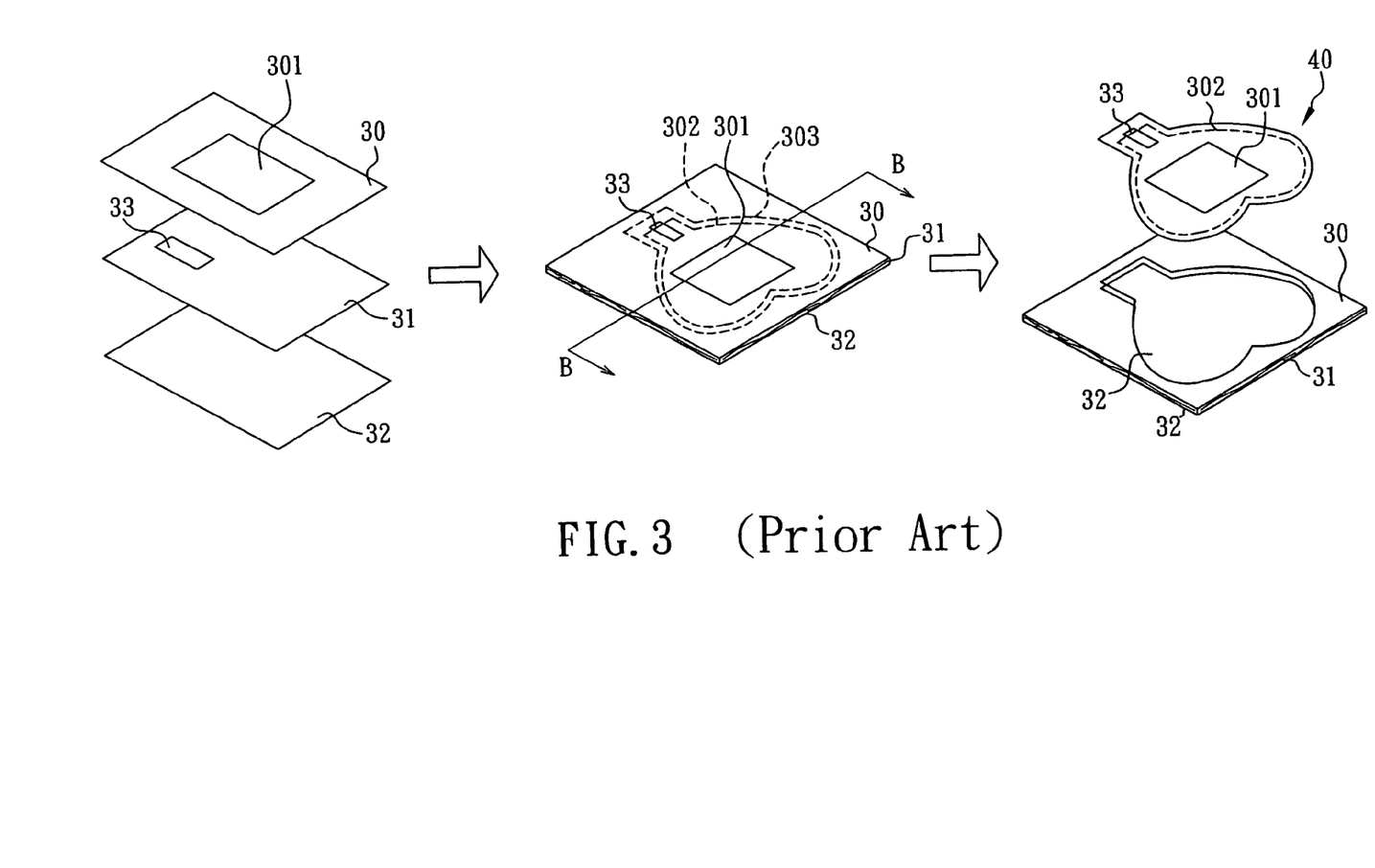
FIG. 3 schematically depicts steps of producing a foil balloon prior to printing according to another prior art technique.
Figure 4:
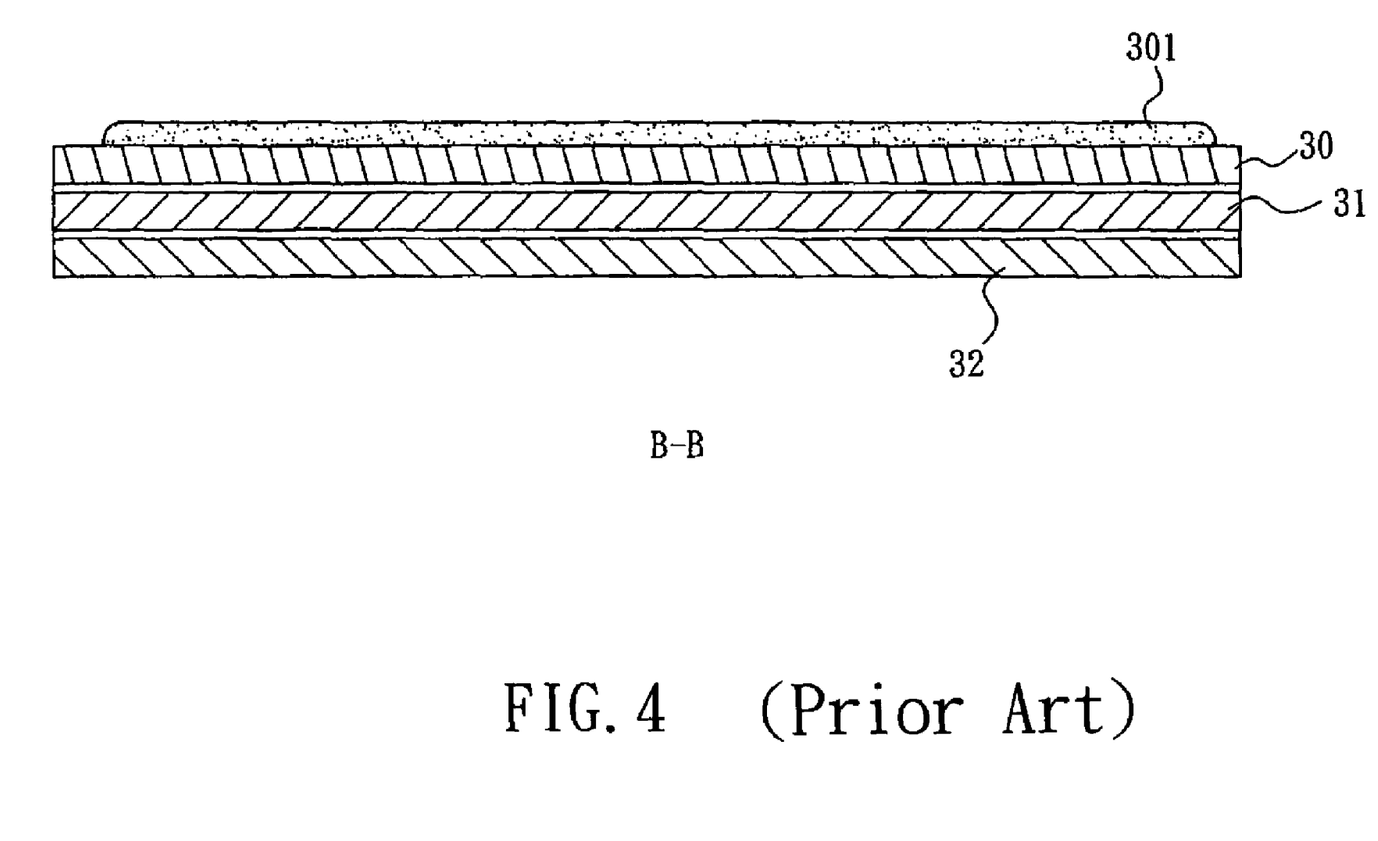
FIG. 4 is a sectional view of the laminated foil balloon on a substrate during manufacture taken along line B-B of FIG. 3.

A common structure of both prior art balloons is detailed by referring to FIGS. 3 and 4. As shown, it is comprised of an upper first film 30, an intermediate second film 31, and a bottom carrier 32 laminated together. Further, an ink flood coating 301 of ink absorbing nature is coated on a portion of the first film 30. A bottom surface of the first film 30 is releasably attached onto a top surface of the second film 31. A valve 33 is compressed between and by the first and second films 30 and 31. A bottom surface of the second film 31 is releasably attached onto a top surface of the carrier 32. The carrier 32 is formed of paper or a shape-retaining material. The carrier 32 is stiffer than the first and second films 30 and 31 so as to support them. Further, the finished balloon product (i.e., foil balloon) prior to inflation can be flat without wrinkles. Thus, the foil balloon can be fed through a printer (not shown) which is, for example instructed by a computer (not shown) to print a customized design on the ink flood coating 301.

Referring to FIGS. 3 and 4 again, a heat sealing device (not shown) is employed in the balloon manufacturing process of both prior art techniques. The heat sealing device (not shown) is adapted to register a predetermined shape (e.g., heart shown in FIG. 3) 302 of the first film 30 with that of the second film 31. Next, a heat sealing process is performed to seal the first and second films 30 and 31 together with the valve 33 compressed therebetween. Next, a sheeting device (not shown) is employed to cut the predetermined shape 302 out of the first and second films 30 and 31 along a perforated outline 303. As such, a foil balloon 40 is produced. Next, feed the foil balloon 40 through a printer to print a customized design on the ink flood coating 301. Next, the user may tear the foil balloon 40 printed with the customized design out of the carrier 32 along the outline 303. Finally, inflate the foil balloon 40 with air through the valve 33 to form a desired three-dimensioned sphere.

While both prior art techniques enable a user to print a desired design including a colorful one on the outer surface of the foil balloon by means of a printer, only one side of the foil balloon is allowed to print rather than both sides. Hence, a need has arisen for apparatus and method of manufacturing balloon assemblies which each is capable of enabling a user to print a colorful customized design on one side or either side thereof.

SUMMARY OF THE INVENTION

After considerable research and experimentation, a foil balloon for enabling a user to print a customized design on either side and method of manufacturing same according to the invention has been devised so as to overcome the above drawback of the prior art.

It is an object of the invention to provide a foil balloon which enables a user to print a customized design on each of both sides. A balloon assembly comprises a carrier formed of paper or a shape-retaining material. The carrier comprises a central opening. A first foil and a second foil are releasably attached onto both side surfaces of the carrier respectively. An ink flood coating of ink absorbing nature is coated on at least one of a surface of the first or second foil opposite to the carrier. A valve is provided between the first and second foils and is disposed correspondingly to a position of an inner edge of the opening. A heat sealed portion is formed around the inner edge of the opening on each of the first and second foils after heat sealing the first and second foils together with the valve being sealed by the heat sealed portion of the first and second foils. Perforations are punched on each of the first and second foils at a position between the heat sealed portion and the inner edge of the opening. By utilizing the invention, a balloon assembly can be fed through an output device (e.g., printer) which is, for example instructed by a computer to print a customized design on an ink flood coating coated on at least one of two sides of the balloon assembly. After the foil balloon assembly is printed with the customized design on either side or both sides thereof, a user may get a foil balloon out of the balloon assembly by tearing along the perforations. Finally, inflate the foil balloon with air through the valve to form an erect balloon with the customized design printed on either side or both sides thereof.

It is another object of the invention to provide a method of manufacturing a foil balloon, the method comprising the steps of forming an opening on a central portion of a carrier; releasably attaching a first foil to a bottom surface of the carrier; disposing a plurality of valves on the first foil to be corresponding to a position of an inner edge of the opening; releasably attaching a second foil to a top surface of the carrier; activating a first heat sealing device to heat seal overlapped portions of the first foil, the carrier section other than the opening, and the second foil to form a lamination; activating a cooling device to cool the overlapped portions of the first foil, the carrier section other than the opening, and the second foil to make the lamination flat without wrinkles or ripples being formed; activating a second heat sealing device to heat seal the inner edges of the overlapped portions of the first and second foils joining the opening to form heat sealed portions through the inner edge of the opening abutted on the first and second foils with the valve being sealed between and by the first and second foils; and activating a punching and sheeting device to punch perforations on the first and second foils around the overlapped heat sealed portions and the inner edge of the opening, and cut the carrier sections into a plurality of balloon assemblies. It is contemplated by the invention that a user is allowed to print a customized design on either side of each balloon assembly by passing the balloon assembly through a printer.

The above and other objects, features and advantages of the invention will become apparent from the following detailed description taken with the accompanying drawings.

DETAILED DESCRIPTION OF THE PREFERRED EMBODIMENTS

Figure 5:
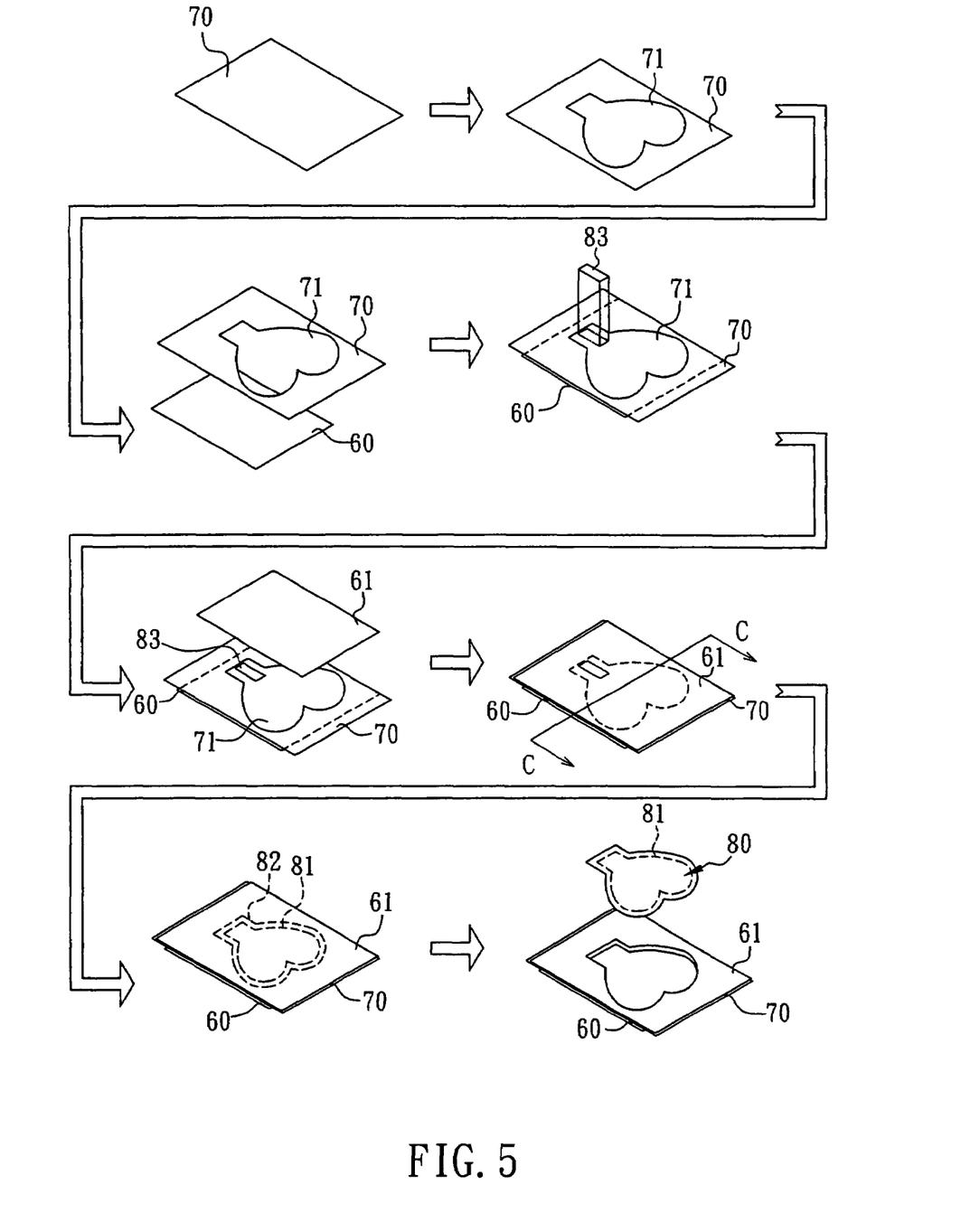
FIG. 5 schematically depicts steps of producing a foil balloon prior to printing according to a process of the invention.
Figure 7:
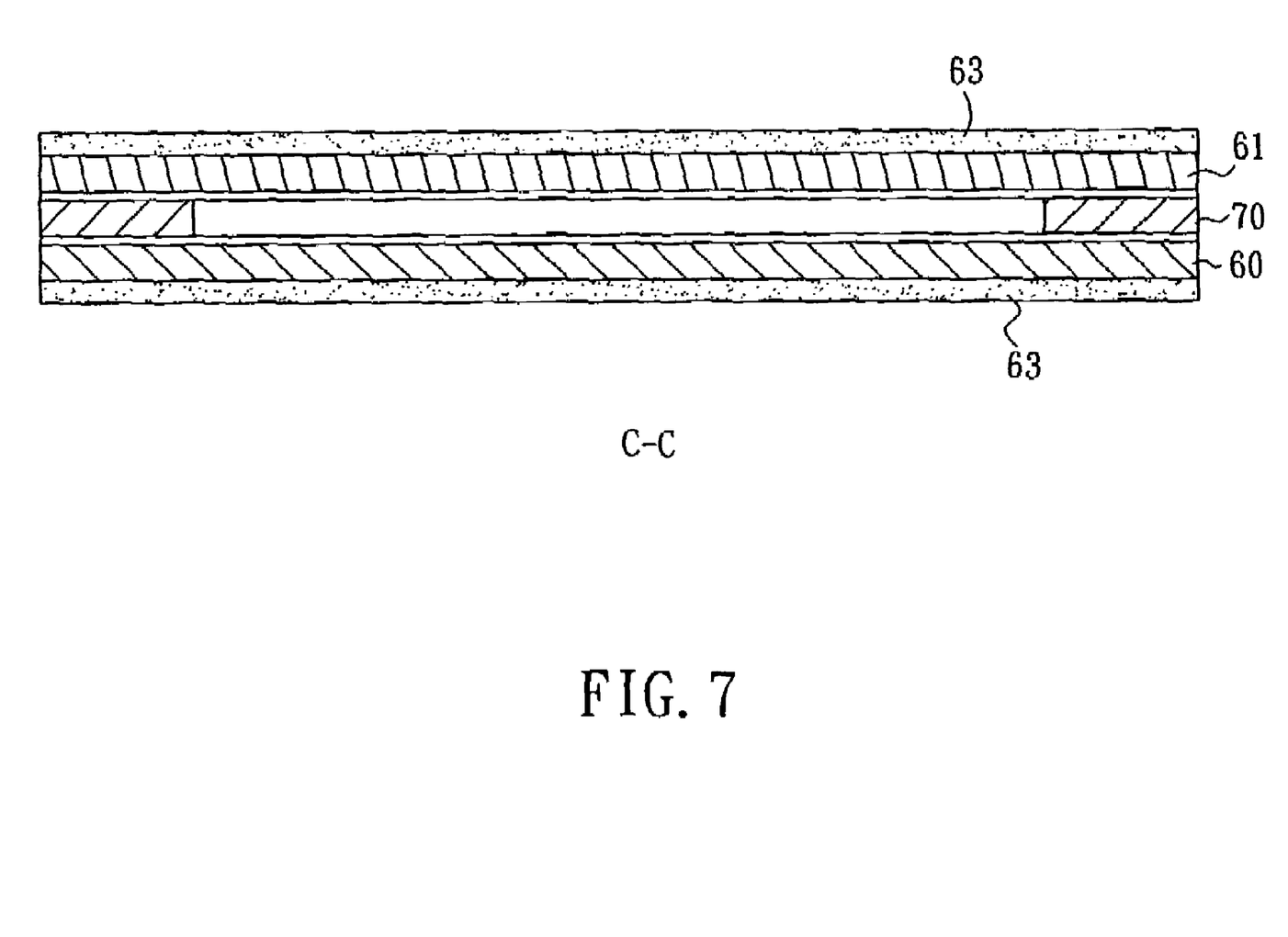
FIG. 7 is a diagrammatic view of an apparatus for manufacturing foil balloons according to the invention.

Referring to FIGS. 5 and 7, an apparatus for manufacturing foil balloons according to the invention is shown. The inflatable foil balloon (hereinafter called balloon) comprises a carrier 70 formed of paper or a shape-retaining material, the carrier 70 including top and bottom PE films (not shown) and a central opening 71. An upper second foil 61 and a lower first foil 60 are releasably attached onto top and bottom surfaces of the carrier 70 respectively. As known in the art, each of the laminated first and second foils 60 and 61 is comprised of a top or bottom PE film (not shown), a nylon film (not shown) coated thereon, and an aluminum coating (not shown) coated on the nylon film for making a design to be printed on the nylon film glossy. Further, an ink flood coating 63 of ink absorbing nature is coated on a top surface (i.e., the nylon film) of the second foil 61 and a bottom surface of the first foil 60 respectively.

Referring to FIGS. 5 and 7 again, in the invention a valve 83 is provided between the first and second foils 60 and 61 and is disposed correspondingly to a position of an inner edge of the heart shaped opening 71. Heat sealed portions 81 are formed around inner edge of the opening 71 abutted on the first and second foils 60 and 61 after heat sealing the first and second foils 60 and 61 (i.e., facing PE films thereof) together. Also, the valve 83 is sealed between and by the heat sealed portions 81. Thus, overlapped portions of the first and second foils 60 and 61 corresponding to inner edge of the opening 71 are sealed, resulting in an airtight enclosure with only one passage to the external through the valve 83. Heart shaped perforations 82 are formed on each of the first and second foils 60 and 61 at a position between the overlapped heat sealed portions 81 and the inner edge of the opening 71. As stated above, the carrier 70 is formed of paper or a shape-retaining material. Further, the carrier 70 is stiffer than the first and second foils 60 and 61 so as to support them. Thus, the foil balloon can be fed through an output device (e.g., printer (not shown)) which is, for example instructed by a computer (not shown) to print a customized design on the ink flood coating 63 which is coated on at least one side of the foil balloon. Next, a user may tear a foil balloon 80 with the customized design printed on one side or either side out of the carrier 70 along the perforations 82. Finally, inflate the foil balloon 80 with air through the valve 83 to form an erect balloon 80 with the customized design printed on either side.

Figure 6:
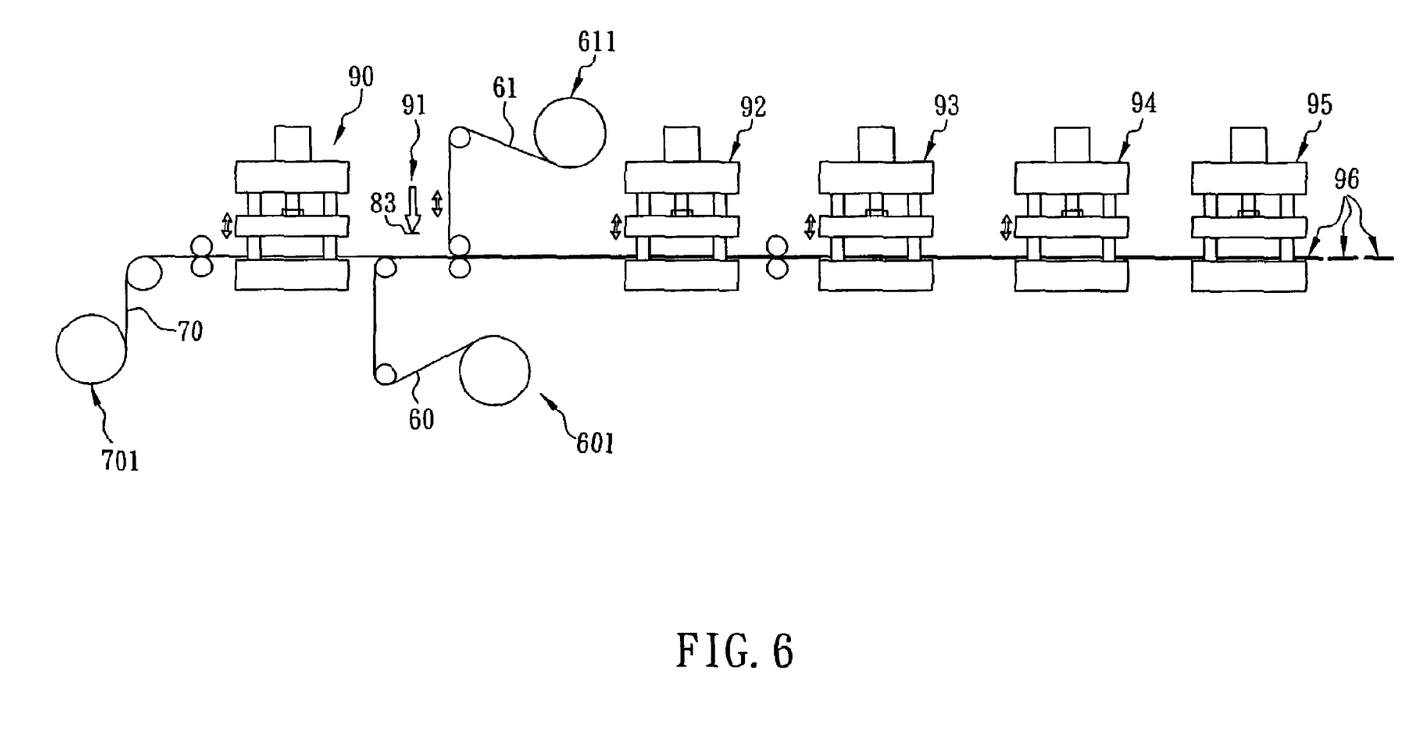
FIG. 6 is a sectional view of the laminated foil balloon during manufacture taken along line C-C of FIG. 5.

Referring to FIG. 6 in conjunction with FIGS. 5 and 7, a process for manufacturing foil balloons according to the invention is illustrated in which the apparatus shown in FIG. 6 is utilized. The process comprises the following steps:

(1) A carrier 70 wrapped around a first spool 701 is conveyed in a continuous web form to a punching device 90 which continuously punches a central opening 71 on a section of the passing carrier 70 having a predetermined length. The carrier 70 having a plurality of separable sections is then conveyed to a next stage.

(2) A first foil 60 wrapped around a second spool 601 is conveyed in a continuous web form to be releasably attached onto a bottom surface of the carrier 70 prior to entering the above next stage.

(3) An adhesive bonding device 91 as the above last stage is adapted to place a valve 83 in position on the first foil 60 and a valve 83 is disposed correspondingly to a position of an inner edge of the opening 71.

(4) In a next stage, a second foil 61 wrapped around a third spool 611 is conveyed in a continuous web form to be releasably attached onto a top surface of the carrier 70 prior to entering a next stage.

(5) A first heat sealing device 92 is activated to heat seal the overlapped portions of the first foil 60, each carrier section 70 other than the opening 71, and the second foil 61, resulting in a laminated construction of each carrier section 70 except the opening 71.

(6) A cooling device 93 as a next stage is activated to cool the overlapped portions of the first foil 60, each carrier section 70 other than the opening 71, and the second foil 61, resulting in a flat lamination. This can prevent wrinkles or ripples from occurring in a next stage of heat sealing.

(7) A second heat sealing device 94 is activated to heat seal a peripheral edge of the overlapped portions of the first and second foils 60 and 61 joining the opening 71, resulting in the forming of heat sealed portions 81 through and around the inner edge of the opening 71 abutted on the first and second foils 60 and 61. Also, the valve 83 is sealed between and by the heat sealed portions 81 of the first and second foils 60 and 61. Thus, portions of the first and second foils 60 and 61 between their peripheries and the opening 71 are sealed, resulting in an airtight enclosure with only one passage to the external through the valve 83.

(8) A punching and sheeting device 95 is activated to punch heart shaped perforations 82 through the first and second foils 60 and 61 substantially around the overlapped heat sealed portions 81 and the inner edge of the opening 71 joining the first and second foils 60 and 61. Finally, the punching and sheeting device 95 cut the carrier 70 sealed with the first and second foils 60 and 61 along the perforated section line into a plurality of balloon assemblies 96. For example, a person may buy one balloon assembly 96 and pass it through a printer (not shown) to print a customized design on one side of the balloon assembly 96 or both two sides of the balloon assembly 96 if the printer supports double-sided printing.

In further explanation, a use may create an image including graphics and/or text on a computer by running an application. Next, the user instructs the computer to print the image on a connected printer with the balloon assembly 96 passing through. Next, a customized design is printed on the ink flood coating 63 of one side of the balloon assembly 96 or a customized design is printed on the ink flood coating 63 of either side of the balloon assembly 96. Next, the user tears a foil balloon 80 corresponding to the opening 71 with the customized design printed on one side or either side out of the balloon assembly 96 along the perforations 82. Finally, inflate the foil balloon 80 with air through the valve 83 to form an erect balloon 80 with the customized design printed on at least one side.

In view of the above, only a single ink flood coating is coated on the top surface of the first film. Thus, it is only allowed to print a design on the ink flood coating on the first film as experienced by the well known foil balloon. To the contrary, an ink flood coating 63 is coated on at least one of the first and second foils 60 and 61 according to the invention. Thus, the invention allows a customized design to print on at least one of the first and second foils 60 and 61. This is a key aspect of the invention as compared with the well known foil balloon.

It is noted that the above description is only a preferred embodiment and the invention in not limited by the described embodiment. It is understood by those skilled in the art that the PE films applied on top and bottom surfaces of the carrier 70, the PE film applied on top surface of the first foil 60, and the PE film applied on bottom surface of the second foil 61 can be replaced by films made of other heat-set adhesive materials as long as the top and bottom surfaces of the carrier 70 can be sealed together with both the first and second foils 60 and 61 in the heat sealing process without departing from the scope and spirit of the invention set forth in the claims.

What is claimed is:

1. A foil balloon which enables a user to print a customized design on both sides of the balloon, comprising:
    a carrier including a central opening;
    a first foil attached to a first side surface of the carrier;
    a second foil attached to a second side surface of the carrier; and
    a valve mounted between the first and second foils and disposed at a position corresponding to an inner edge of the opening,
    wherein a heat sealed portion is formed around the inner edge of the opening on each of the first and second foils after heat sealing the first and second foils together, the valve is sealed by the heat sealed portions of the first and second foils to form an airtight enclosure between the first and second foils at positions corresponding to the inner edge of the opening with only one passage passing the valve to communicate with outside, and perforations are formed on each of the first and second foils at a position between the heat sealed portion and the inner edge of the opening.

2. The foil balloon of claim 1, further comprising an ink flood coating with ink absorbing capability coated on a surface of the first foil opposite to the carrier.

3. The foil balloon of claim 2, further comprising an ink flood coating with ink absorbing capability coated on a surface of the second foil opposite to the carrier.

4. The foil balloon of claim 3, further comprising a heat-set adhesive coated on a surface of the first foil confronted by the carrier, a heat-set adhesive coated on a surface of the second foil confronted by the carrier, and a heat-set adhesive coated on the first and second side surfaces of the carrier.

5. The foil balloon of claim 3, wherein the carrier is formed of paper or a shape-retaining material, and the carrier is stiffer than each of the first and second foils for supporting the sealed first and second foils and enabling the carrier together with the first and second foils to pass a printing means.

6. A method of manufacturing a foil balloon which enables a user to print a customized design on both sides of the balloon, the method comprising the steps of:
    forming an opening on a central portion of a carrier;
    releasably attaching a first foil to a bottom surface of the carrier;
    disposing a valve on the first foil at a position corresponding to an inner edge of the opening;
    releasably attaching a second foil to a top surface of the carrier;
    heat sealing, respectively, overlapped portions of the first foil, the carrier section other than the openings and the second foil to form a lamination;
    heat sealing inner edges of the overlapped portions of the first and second foils at positions corresponding to the inner edge of the opening to form heat sealed portions with the valve being sealed between and by the first and second foils; and punching perforations on each of the first and second foils substantially around the overlapped heat sealed portions between the heat sealed portion and the inner edge of the opening.

7. The method of claim 6, wherein after the step of heat sealing overlapped portions of the first foil, the carrier section other than the opening, and the second foil to form a lamination, further comprises the step of cooling the overlapped portions of the first foil, the carrier section other than the opening, and the second foil.

* * * * *